United States Patent [19]
Beinhaur

[11] 3,992,570
[45] Nov. 16, 1976

[54] CABLE END SEALING DEVICES

[75] Inventor: Ernest Lloyd Beinhaur, Harrisburg, Pa.

[73] Assignee: AMP Incorporated, Harrisburg, Pa.

[22] Filed: Oct. 23, 1974

[21] Appl. No.: 517,574

Related U.S. Application Data

[63] Continuation-in-part of Ser. No. 423,943, Dec. 12, 1973, Pat. No. 3,897,088, and a continuation-in-part of Ser. No. 451,620, March 15, 1974, abandoned.

[52] U.S. Cl. .................. 174/135; 29/450; 74/551.9; 138/96 R; 156/294; 174/74 A
[51] Int. Cl.² ..................................... H02G 15/04
[58] Field of Search .................. 174/10, 74 R, 74 A, 174/77 S, 87, 135, 138 F; 29/450, 234, 235; 46/90; 53/196, 197, 200; 74/551.9, 558.5; 128/261, 262; 135/54, 64; 138/89, 96 R, 96 T, 109; 150/3, 8, 52 R; 156/69, 294; 206/306; 215/317, 320, 321; 273/106 E; 339/36, 116 R, 116 C, 213 R, 213 T

[56] References Cited
UNITED STATES PATENTS

| | | | |
|---|---|---|---|
| 687,249 | 11/1901 | Miller .................. | 156/294 X |
| 1,007,730 | 11/1911 | Pozzi .................. | 135/64 |
| 1,435,214 | 11/1922 | Coombs .................. | 215/321 |
| 1,458,247 | 6/1923 | Schleper .................. | 174/138 F UX |
| 1,556,966 | 10/1925 | Selig .................. | 138/96 R UX |
| 2,145,705 | 1/1939 | Wodtke .................. | 174/74 A |
| 2,197,617 | 4/1940 | Magran .................. | 46/90 |
| 2,618,986 | 11/1952 | Hungerford .................. | 74/551.9 |
| 2,674,647 | 4/1954 | Dibner .................. | 174/87 |
| 2,803,056 | 8/1957 | Brissey, Jr. et al. .................. | 29/450 |
| 3,749,093 | 7/1973 | Bloom .................. | 128/262 X |

FOREIGN PATENTS OR APPLICATIONS

| | | | |
|---|---|---|---|
| 225,745 | 5/1958 | Australia .................. | 174/138 F |
| 600,457 | 11/1925 | France .................. | 74/551.9 |
| 632,946 | 10/1927 | France .................. | 74/551.9 |
| 635,134 | 9/1936 | Germany .................. | 150/8 |

Primary Examiner—Laramie E. Askin
Attorney, Agent, or Firm—Russell J. Egan

[57] ABSTRACT

A device to form an effective environmental tight seal on a free end of cables, conduits and the like is disclosed. The subject device is formed by a unitary member of resilient material, such as rubber, which has a cylindrical configuration with one permanently closed end. The closed end has a substantially greater thickness than the sidewalls of the device. The other end is preferably temporarily closed. The device is applied by forcing the permanently closed end against the free end of the cable so that the closed end passes through the cylindrical portion until the device is reversed upon itself and is in sealing gripping engagement on the cable or the like. When one end of the device is temporarily closed by a sealing member, the device will be slightly inflated as it is pushed against the cable end thereby easing application of the device. The temporary seal will be removed by penetration or when internal pressure increases beyond a limit.

5 Claims, 13 Drawing Figures

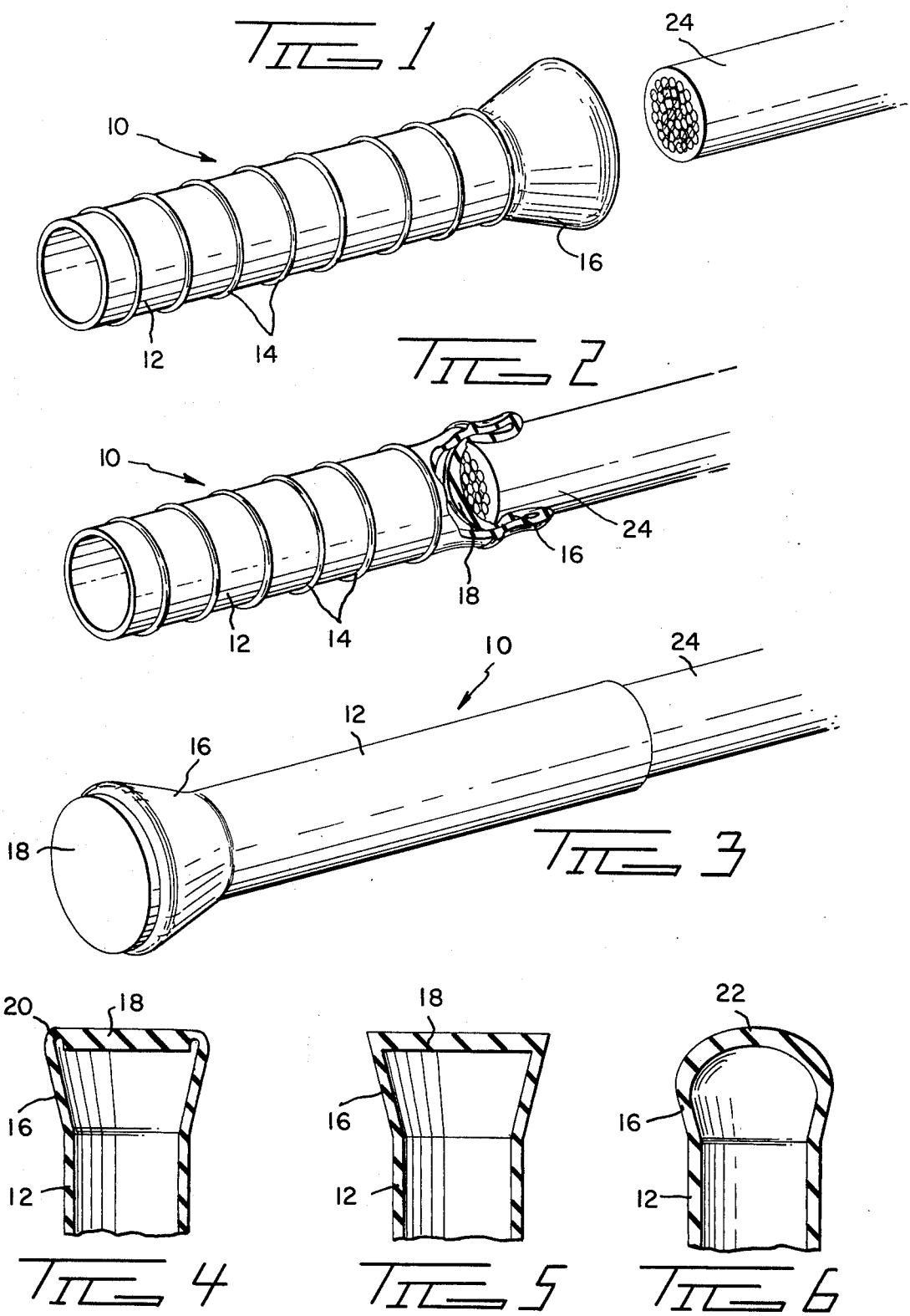

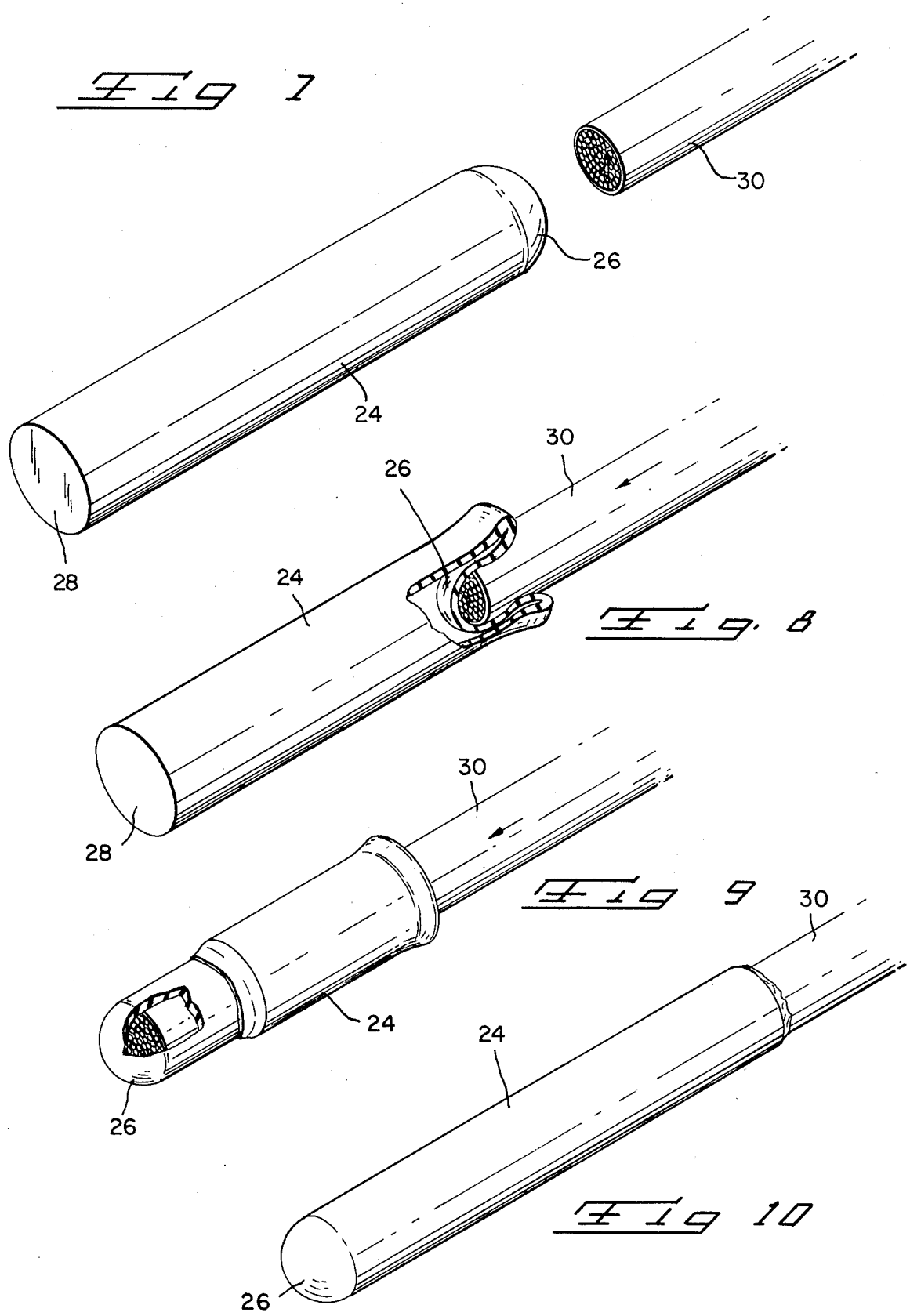

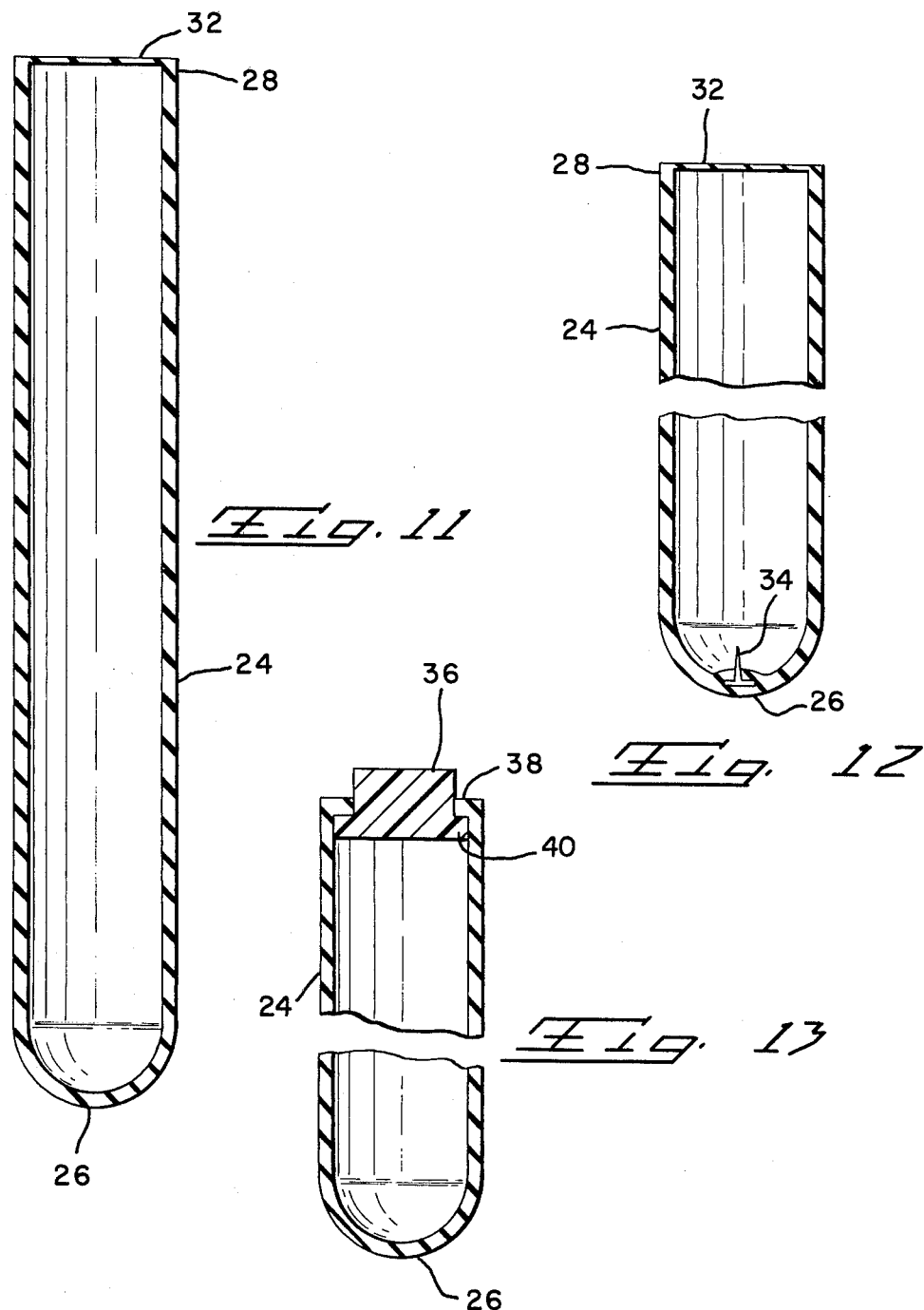

CABLE END SEALING DEVICES

CROSS REFERENCE TO RELATED APPLICATIONS

The present application is a continuation-in-part of my application Ser. No. 423,943, filed Dec. 12, 1973, now U.S. Pat. No. 3,897,088 and my application Ser. No. 451,620, filed Mar. 15, 1974, now abandoned.

BACKGROUND OF THE INVENTION

1. The Field Of The Invention

The present invention relates to improved devices for forming an environmental tight seal on the free ends of cables, conduits and the like.

2. The Prior Art

It is often quite desirable to be able to form an environmental tight seal on the end of a cable, conduit or the like. For example, when electrical lines are initially run, there may be a delay before the final termination or joining of the cable is effected. It is clearly desirable to have such a cable protected from destruction by exposure to the elements by sealing any free ends. However, it is also desirable that any sealing device should have the capability of being readily applied, regardless of the environmental considerations, and likewise be readily removable without leaving any undesired residues or defects in the exterior layer of the cable. It is also desirable to have a sealing device that is not destroyed when it is removed so that it can be repeatedly used, thus providing a long service life.

One well known method for providing a seal is to use a member which is formed of a thermo-plastic material. The member is expanded by the application of heat, positioned over the cable end and allowed to cool and contract to form a tight seal. Sometimes this type of seal may be removed by reheating until it expands again. However, sometimes reheating is not possible because of environmental considerations and the seal must be destroyed to be removed. This type of seal cannot always be used, for example, in an environment filled with explosive gases because it would not be possible to use heat without extreme danger. These thermo-plastic seals also have a very limited life.

Another well known method for sealing a free cable end is to dip the cable end into a molten bath of sealing material which, when hardened, seals the cable end. However, this type of seal is very difficult to remove and thus has only limited applications.

Another known seal for the free end of cables is shown in U.S. Pat. No. 2,145,705. This seal is similar to a bicycle handle-bar grip, such as the one shown in U.S. Pat. No. 2,618,986 and is simply rolled onto the cable end. This type of seal has two primary disadvantages. First it is rather difficult and expensive to apply since the cylindrical sidewalls must first be rolled up. Secondly, the device is usable for only a limited range of diameters of cables.

A further known cable end seal is represented by Australian Pat. No. 225,745. The cover shown in this patent provides a tight seal on the free end of a cable. However, this seal would be very hard to apply since a tool must be used to open the cover. The cable is inserted while the cover is held open by the tool. The tool is then withdrawn allowing the cover to tightly engage the cable.

SUMMARY OF THE INVENTION

The present invention relates to a device for effecting a removable environmental tight seal on the end of cables, conduits and the like. The device is a unitary member of resilient material having a cylindrical configuration which is permanently closed at one end. The end of the cylinder towards the closed end is preferably flared outwardly to a greater diameter than the remainder of the cylinder. The permanently closed end is of substantially greater thickness than the sidewalls of the member. A plurality of integral annular rings are preferably formed on the outer surface of the cylindrical portion. The other end of the cylinder is preferably temporarily closed by a sealing member, which member can include a plug or a frangible seal. The device is applied by forcing the permanently closed end against the cable end so that the closed end is driven through the cylindrical portion which, after being turned inside out, tightly engages and seals the end of the cable.

It is therefore an object of the present invention to produce a sealing device which will provide a removable environmental tight seal on the end of a cable, conduit or the like and protect the sealed object from all environmental conditions, including vibration, without losing the sealing effect.

It is a further object of the present invention to produce a sealing device which can be used under substantially any environmental conditions to tightly seal the end of a cable, conduit or the like and which sealing device can be readily and non-destructively removed when desired.

It is a still further object of the present invention to produce a sealing device for the ends of cable, conduits and the like which can be readily and economically manufactured.

The means for accomplishing the foregoing and other objects and advantages of the present invention will become apparent from the following detailed description taken with reference to the accompanying drawings.

BRIEF DESCRIPTION OF THE DRAWINGS

FIG. 1 is a perspective view of the subject sealing device aligned with the free end of a cable;

FIG. 2 is a perspective view, similar to FIG. 1, showing the subject sealing device during an initial phase of application onto the cable end;

FIG. 3 is a perspective view showing the subject sealing device fully applied and tightly sealing the cable end;

FIG. 4 is a partial longitudinal section through the closed end of a first embodiment of the subject sealing device;

FIG. 5 is a partial longitudinal section through the closed end of a second alternate embodiment of the subject sealing device;

FIG. 6 is a partial longitudinal section through the closed end of a third alternate embodiment of the subject sealing device;

FIG. 7 is a perspective view of a fourth alternate embodiment of the subject end sealing device aligned with the fragmentary end of a cable;

FIG. 8 is a perspective view, partially in section, of the end sealing device of FIG. 7 in initial engagement with the free end of a cable;

FIG. 9 is a perspective view, partially in section, of the end sealing device of FIG. 7 after the device has begun to be reversed upon itself;

FIG. 10 is a perspective view showing the end sealing device of FIG. 7 fully mounted on the cable;

FIG. 11 is a longitudinal section through a fifth alternate embodiment of the end sealing device;

FIG. 12 is a foreshortened longitudinal section through a sixth alternate embodiment of the end sealing device; and FIG. 13 is a foreshortened longitudinal section through a seventh alternate embodiment of the end sealing device.

DETAILED DESCRIPTION OF THE SUBJECT INVENTION

The subject end sealing device is shown in FIGS. 1–3 at three points in time during application onto the free end of a cable. The subject sealing device 10 has a cylindrical main body 12 with a plurality of integral annular bands 14 spaced therealong. One end 16 of the cylindrical body is flared outwardly to a larger diameter and is closed by an end wall 18. The end wall 18 is of substantially greater thickness than the walls of the cylindrical body 12. The greater thickness of the end wall prevents unevenly cut conductors projecting from the cable end from piercing the sealing device and thereby destroying its effectiveness as an environmental seal. The entire device is a unitary member formed of a flexible, resilient insulator material, such as rubber.

It will be seen in FIGS. 4–6 that the closed end of the device can have several different sectional configurations. The preferred embodiment is shown in FIG. 4. The end wall 18 is joined to the flared portion 16 by an annular joint 20 which is of somewhat lesser thickness than both the cylinder walls and the end wall. This joint, because of its flexibility, allows for the easy application of the sealing device to the cable. The arcuate section of the annular joint assists in starting the sealing device to roll upon itself to an inside out condition in which it sealingly engages the cable.

The second embodiment, shown in FIG. 5, is simply a truncated conical flare with the larger end closed by end wall 18. While this embodiment still accomplishes the desired seal, it is somewhat more difficult to apply than the first embodiment. This is because the joint between the walls of the conical flare and the end wall is thicker and therefore less flexible than is the case for the embodiment of FIG. 4.

The third embodiment, shown in FIG. 6, has a flared end closed by a partial spherical end wall 22. This end wall, as is the case with the other embodiments, is somewhat thicker than the rest of the device. This embodiment does not have a relatively stiff, annular joint which must be overcome during application.

The sealing device is applied by pressing the closed end wall 18 against the free end of the cable 24 and continuing to push the cylindrical portion so that the closed end passes therethrough, see FIG. 2, until the device is completely reversed (inside out) upon the cable, as shown in FIG. 3. The annular bands 14 serve both as strengthening bands assisting formation of environmental sealing engagement with the cable as well as gripping assists during application of the sealing device. It may also be desirable to coat the sealing device with either a wet or a dry lubricant prior to applying it to a cable, conduit or the like.

The subject sealing device can produce sufficient gripping force to enable it to remain in place on the free end of a fluid pressurized conduit. There are, of course, limits to the amount of pressure the subject device will withstand before being dislodged.

The alternate closed sealing embodiment of the subject device shown in FIGS. 7 to 13, is also intended for sealing off the free end of a conduit, cable or the like. This sealing device comprises a closed cylindrical member 24 having a permanently closed first end 26 and a temporarily closed opposite end 28. The permanently closed end 26 sealing device 24 is aligned with the end of, in this instance, a cable 30 and is sealed thereon by pushing the permanently closed first end 26 against the free end of the cable. As the first end 26 is forced reversedly into the cylindrical body, FIG. 8, it causes an increase in the air pressure therein, because of the decreasing volume, and forces the cylindrical member 24 to expand radially outwardly thereby accommodating the continued rearward movement of the first end 26. When the first end 26 engages the closed second end 28, the second end 28 is opened, as shown in FIG. 9. The cylindrical member is rolled out until it finally rests upon the cable 30 in an inside-out condition, as shown in FIG. 10.

If it is intended to seal the end of the cable for only a temporary interval, then the second closed end need not be opened so that the end sealing device can be readily removed from the cable. However, if the duration of the requirement for the seal cannot be foretold with any degree of accuracy, then the complete mounting procedure as shown in FIGS. 8 to 10 would be followed.

The embodiment of the end sealing device shown in the FIGS. 8 to 10 is shown in vertical longitudinal section in FIG. 11. This end sealing device 24 is simply an elongated cylindrical member permanently closed at a first end 26 and temporarily closed at the second end by a frangible seal 32.

The subject end sealing device shown in FIG. 12, has a pointed member 34 fixed inside the member 24 at the first end 26 with the point directed towards the frangible seal 32 to assist in breaking the seal during the mounting of the device on the cable.

FIG. 13 shows a further alternate embodiment with a removable plug 36 held in the end of the cylindrical member 24 by an inwardly directed annular flange 38 on the cylindrical member 24 engaging an outwardly directed annular flange 40 on the plug 36. In this particular embodiment, when the pressure inside the end sealing device has risen to a predetermined amount, the pressure will force the plug from the end of the device. The plug is usually driven from the sealing device with a certain amount of force which is neither dangerous nor undesirable.

From the foregoing it will be readily apparent that either of the end embodiments of the subject sealing device can be selectively positioned on a cable, conduit, or the like and sealed thereon for either making a permanent or a temporary seal. The operation of the latter device depends upon the inflatability of the device to enable it to be positioned upon the member to be sealed. It is the inherent properties of the sealing device material which allow an environmental tight seal to be formed at the desired location.

The present invention may be subject to many modifications and changes without departing from the spirit or essential characteristics thereof. The above described embodiments are therefore intended to be in all respects as illustrative and not restrictive of the scope of the invention.

What is claimed is:

1. A sealing device for effecting an environmental tight seal on a free end of a cable, conduit, or the like, said sealing device comprising:
   a hollow unitary member of flexible resilient material including a cylindrical body, a conically outwardly flared portion extending from one end of said cylindrical body, an end wall closing the larger end of said conically flared portion, said end wall having a substantially greater thickness than the sidewalls of said body, and a plurality of annular bands spaced along the outer surface of said cylindrical body, means temporarily closing the other end of said hollow unitary member whereby pressing of the end wall against an end of a cable, conduit, or the like causes limited inflation of said hollow unitary member thereby easing passage of said end wall through said hollow unitary member until it sealingly engages such end in an inside-out condition, said temporary closure means being removed by said through passage.

2. A sealing device according to claim 1 wherein said end wall is planar.

3. A sealing device according to claim 2 wherein said end wall is joined to said conically flared portion by an annular joint of lesser thickness than said sidewalls, said annular joint having an arcuate section.

4. A sealing device according to claim 1 wherein said end wall has a part spherical configuration and is joined to said conically flared portion by a continuous curved annular joint.

5. A sealing device for effecting an environmental tight seal on a free end of a member, such as a cable, conduit, or the like, said device comprising:
   a hollow cylindrical member of inflatable material capable of withstanding low internal pressures, and having a permanently sealed first end, a frangible seal temporarily sealing a second end, and pointed means fixed to said permanently sealed first end which, when brought into contact with the second end of said device, causes the frangible seal to be ruptured thereby allowing passage therethrough of said first end, said device being reversible upon itself during application by pressing said first end against said free end and driving said first end through said hollow cylindrical member.

* * * * *